United States Patent
Takayanagi

(10) Patent No.: US 6,407,472 B1
(45) Date of Patent: *Jun. 18, 2002

(54) MOTOR STRUCTURE AND THEIR MANUFACTURING METHOD

(75) Inventor: Shinichi Takayanagi, Miyota-machi (JP)

(73) Assignee: Minebea Co., Ltd., Nagano (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/382,115

(22) Filed: Aug. 24, 1999

Related U.S. Application Data

(62) Division of application No. 09/069,951, filed on Apr. 30, 1998.

(30) Foreign Application Priority Data

May 19, 1997 (JP) ............................... 9-128205

(51) Int. Cl.⁷ .............................. H02K 1/24; H02K 1/12
(52) U.S. Cl. ........................ 310/45; 310/216; 310/254; 310/43; 29/596; 427/104
(58) Field of Search .................... 310/45, 216, 217, 310/254, 258, 259, 43; 29/596, 592.1, 609; 427/104, 58; 336/210–213, 216–219, 233, 234

(56) References Cited

U.S. PATENT DOCUMENTS

| | | | |
|---|---|---|---|
| 3,025,188 A | * 3/1962 | Larsh et al. | 117/230 |
| 3,247,004 A | * 4/1966 | Dosser | 117/18 |
| 3,537,875 A | * 11/1970 | Kerr | 117/21 |
| 3,766,416 A | * 10/1973 | Papst et al. | 310/43 |
| 3,768,152 A | * 10/1973 | Swanke et al. | 29/596 |
| 3,813,763 A | * 6/1974 | Church | 29/596 |
| 3,963,949 A | 6/1976 | Church | 310/43 |
| 5,113,105 A | * 5/1992 | Ikegami et al. | 310/233 |
| 5,176,946 A | * 1/1993 | Wieloch | 428/138 |
| 5,323,074 A | * 6/1994 | Sakashita et al. | 310/43 |
| 5,508,578 A | * 4/1996 | Suzuki et al. | 310/254 |
| 5,658,660 A | * 8/1997 | Teshima et al. | 428/334 |
| 5,663,601 A | * 9/1997 | Wakabayashi et al. | 310/45 |
| 5,672,927 A | * 9/1997 | Viskochil | 310/194 |
| 5,806,169 A | 9/1998 | Trago et al. | 29/596 |
| 5,866,961 A | * 2/1999 | Suzuki et al. | 310/67 R |
| 5,922,413 A | * 7/1999 | Takeda | 427/470 |
| 5,937,503 A | 8/1999 | Walters | 29/564.2 |
| 6,043,583 A | * 3/2000 | Kurosawa et al. | 310/254 |

FOREIGN PATENT DOCUMENTS

| | | |
|---|---|---|
| EP | 0514875 A2 | 11/1992 |
| EP | 0570231 B1 | 11/1993 |
| WO | WO 97/00550 | 1/1997 |

OTHER PUBLICATIONS

Merriam Webster's Collegiate Dictionary, tenth edition, 1993, p. 210.*

* cited by examiner

Primary Examiner—Nestor Ramirez
Assistant Examiner—Dang Dinh Le
(74) Attorney, Agent, or Firm—Staas & Halsey LLP

(57) ABSTRACT

The motor structure, which has a laminated structure of plural plates 1 and also has a stator pole assembly 10 formed with a component mounting portion, comprises a synthetic resin layer 6 which encloses and covers the plural plates 1 while holding the plates in a closely contacted state, overhang portions (8, 9) integral with the synthetic resin layer 6 and which serve to not only hold but also position motor components, and an insulating film 7' which covers portions not coated with the synthetic resin. While the synthetic resin layer is formed on the surface of the lamination stack, pressure is applied to the laminated plates as constituents of the stator pole assembly from both upper and lower surfaces of the laminate. This application of pressure is performed using plate pressing projections formed in the mold.

7 Claims, 4 Drawing Sheets

MOTOR STRUCTURE AND THEIR MANUFACTURING METHOD

This application is a divisional of application Ser. No. 09/069.951, filed Apr. 30. 1998, now pending.

BACKGROUND OF THE INVENTION

1. Field of the Invention

The present invention relates to a motor structure and a method for manufacturing the same. Particularly, the invention is concerned with a motor structure and a method for manufacturing the same which motor structure and method permit easy insulation of stator poles formed by lamination of soft magnetic plates and easy mounting of components to the stator poles.

2. Description of the Prior Art

Small-sized synchronous motors and stepping motors are used as drive sources of various electronic devices such as floppy disk drives which are peripheral devices of personal computers. As an example of these motors there is known an inner rotor type motor in which a cylindrical rotor comprising poles of permanent magnets is disposed rotatably, and magnetic poles of a stator for generating a rotating magnetic field and thereby imparting a driving force to the rotor are disposed around the rotor in a face-to-face relation to the rotor. The stator poles are fixed to a substrate constituted by an insulated metal plate, while the rotor is supported by two bearings which are fixed respectively to the substrate and the stator poles. Onto the substrate are further fixed an electronic circuit for driving the motor, as well as components such as a position detecting coil for detecting the position of the rotor.

There also is known an outer rotor type motor in which a plurality of magnetic poles are projected radially from an annular yoke member and stator coils are wound round those magnetic poles to constitute stator poles, which stator poles are fixed to a substrate, while a shallow dish-like, or tray-like, rotary disk is disposed rotatably around the stator poles, and permanent magnets disposed inside the edge of the rotary disk are made face to face with the front ends of the stator poles.

According to the prior art, in fabricating the stator poles, no matter which type of motor may be concerned, a plurality of plates formed by pressing from a soft iron plates are stacked together to constitute a lamination stack, then for ensuring insulation between the lamination stack and a coil wound round the stack, an insulator is formed separately using an insulating material such as resin for example and is inserted into the coil winding portion of the lamination stack, or an insulating paint is sprayed directly to the lamination stack to form a thin insulating film on the whole surface of the lamination stack, or the lamination stack is subjected to a chemical treatment to form an insulating film on the surface thereof.

As mentioned above, the conventional assembling method involving separately forming an insulator for the lamination stack, inserting it between magnetic poles and winding a coil thereon, is expensive because of separate formation of the insulator and requires additional number of steps for assembling the insulator.

In the above formation of the insulating film by spray coating, it is impossible to form an insulating film having a uniform thickness throughout the whole surface of the lamination stack. Particularly, corners and edges are apt to be insufficient in thickness, which may cause dielectric breakdown during use of the motor. Further, in the recent assembling work for a smallsized motor, there is no space for clamping the whole of a pressed plate with pressure using eyelet or the like, with no clamping pressure exerted on the front-end peripheral edge of a stator pole tooth 100, as shown in FIGS. 6 and 7. Consequently, there occurs a gap between adjacent laminated plates of the assembled motor, and the plates are rusted in their interiors when used over a long years. Besides, when the stator is excited or the rotor is rotated, the plates vibrate and generate noise. There is an additional inconvenience such that bearing parts and other motor constituting parts must be mounted one by one to the substrate at the time of assembly. In FIGS. 6 and 7, the numeral 101 denotes a lamination stack which represents the whole of a stator pole, numeral 102 denotes a yoke portion, numeral 103 denotes a caulking portion for clamping plates 104, and numeral 105 denotes a coating surface which coats the lamination stack 101 in the spray method.

SUMMARY OF THE INVENTION

The present invention intends to eliminate the above-mentioned inconveniences of the prior art and it is an object of the invention to provide a novel motor structure and method for manufacturing the same which, when laminating plates as constituents of a lamination stack, can clamp the plates hermetically under pressure and can mount components of the motor to the lamination stack before mounting the motor to a substrate or the like.

According to the present invention, in order to achieve the above-mentioned object, there is provided a motor structure having a laminated structure of plural plates and also having a stator pole assembly formed with a component mounting portion, the motor structure comprising a synthetic resin layer which encloses and coats the plural plates in a closely contacted state of the plates, an overhang portion integral with the synthetic resin layer and which serves to not only hold but also position motor components, and an insulating film which covers a portion not coated with the synthetic resin layer. There also is provided a method for manufacturing a motor structure having a laminated structure of plural plates and a stator pole assembly formed with a component mounting portion, characterized in that a synthetic resin layer is formed on the surface of a lamination stack under the application of pressure from both upper and lower surfaces of the laminated plates which constitute the stator pole assembly.

DESCRIPTION OF THE PREFERRED EMBODIMENTS

Figure 1:
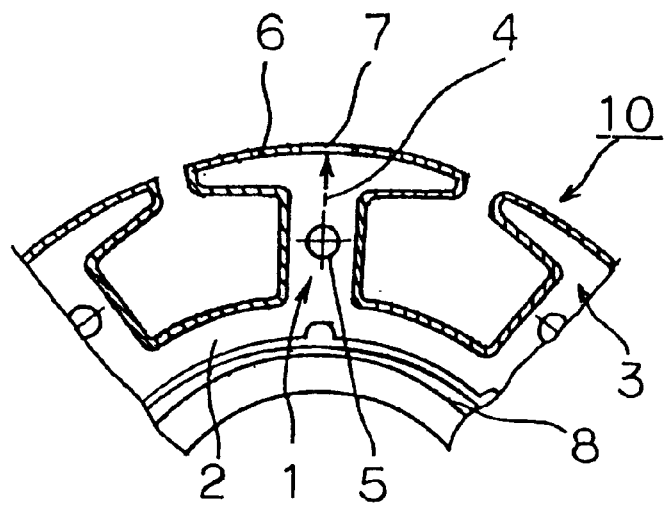
FIG. 1 is a partial front view of a motor's stator pole of this invention.
Figure 2:
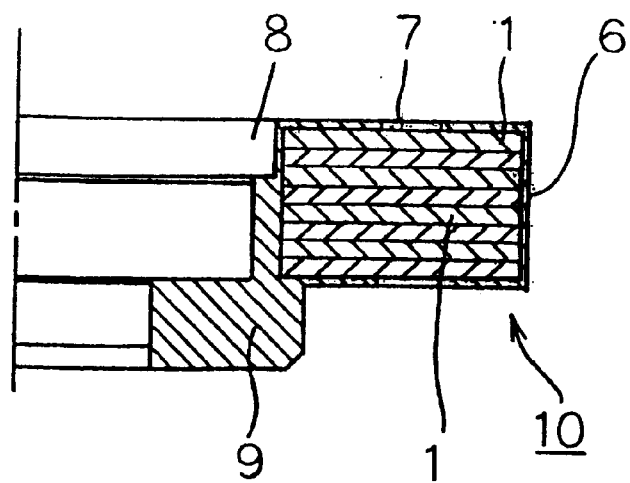
FIG. 2 is a partial sectional view of a motor's stator pole of this invention.

An embodiment of the present invention will now be described in detail with reference to the accompanying drawings. FIGS. 1 and 2 are a partial front view and a partial sectional view, respectively, showing a stator pole used in a motor structure embodying the present invention. In these figures, the numeral 1 denotes a plate as a constituent of the stator pole. The plate 1, which is a soft magnetic plate, has an annular yoke portion 2, stator pole portions 3 projecting in a plural number radially outwards from the yoke portion 2, and stator pole teeth 4 formed respectively at the tips of the stator pole portions 3. Plural such plates 1 are laminated together and are caulked at a nearly central portion 5 of each stator pole portion 3. In this state, gaps are formed between stator pole teeth 4, 4 and also between yoke portions 2, 2 of adjacent laminated plates because the tip portions of the stator pole teeth 4 and the yoke portions 2 are not vertically pressed. This problem will be solved if these portions are each formed with a caulking portion as is the case with the stator pole portion 4. However, there is no space for the provision of such fixing means. It also may be one solution to spot-weld the whole of the plates in the thickness direction. However, this method is inconvenient because there will occur an eddy current loss.

In this embodiment, in view of the above-mentioned points, a mold is provided so that a lamination stack constituted by laminating the plates 1 is coated with a synthetic resin material. Projections for pressing the stator pole teeth 4 and the yoke portions 2 of the laminated plates from both upper and lower surfaces are formed beforehand within the mold. The lamination stack is loaded into the mold and the synthetic resin is poured into the mold to form a thin synthetic resin layer 6 on the surfaces of yoke portions 2, stator pole portions 3 and the stator pole teeth 4. Further, spaces for forming portions to fix such components as bearings are formed beforehand in the mold. Therefore, a stator pole assembly after the molding is provided with the said portions, namely overhang portions for not only holding but also positioning motor components. In this embodiment, as shown in FIG. 2, there are formed a circular groove 8 for loose fitting therein of a rotor hub as will be described later and a projection 9 for positioning a stator pole assembly 10 with respect to a substrate.

In this embodiment, since the stator pole teeth 4 and the yoke portions 2 are pressed from both upper and lower surfaces by means of projections during molding and in this state the synthetic resin is poured into the mold, the plates when taken out from the mold are in a mutually closely contacted state. But there appear exposed portions 7 is not coated with the synthetic resin. Also at the portions which have been in contact with the inner wall of the mold there appear exposed portions 7 and caulking portions 5 not coated with the synthetic resin.

Further, there sometimes appear surface portions partially not coated with the synthetic resin when the resin does not spread uniformly (short mold), for example, when the resin flowing condition changes during molding or when there occurs a positional deviation upon loading of the lamination stack into the mold.

Figure 3:
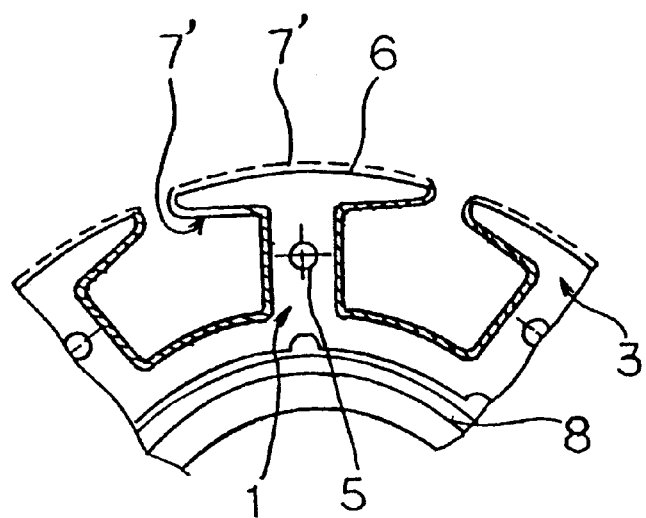
FIG. 3 is a partial front view of an exposed position adhered with an insulating film.
Figure 4:
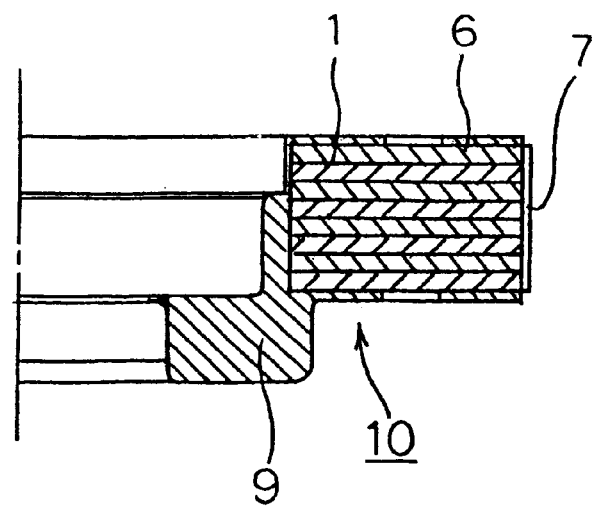
FIG. 4 is a partial sectional view of an exposed position adhered with an insulating film.

In this embodiment, as shown in FIGS. 3 and 4, the exposed portions 7 and the caulking portions 5 not coated with the synthetic resin are coated with an insulating film 7' of a synthetic resin or the like by electrode position coating or by spray coating. More specifically, for example, the whole of the stator pole assembly 10 after taken out from the mold is put into a coating solution tank and is electrically charged negatively, then fine particles of a coating material, which is a positively charged insulating material, are adsorbed on the exposed portions 7 and caulking portions 5 not coated with the synthetic resin. For example, after the stator pole assembly 10 has been charged negatively, if fine particles of the positively charged insulating material as the coating material are sprayed as fine bubbles toward the stator pole assembly 10, the bubbles of the coating material will be concentrated and adsorbed on the exposed portions 7. Upon subsequent drying of the coating material thus applied, all the exposed portions on the surface of the stator pole assembly are covered with the insulating film 7' formed of the coating material.

Figure 5:
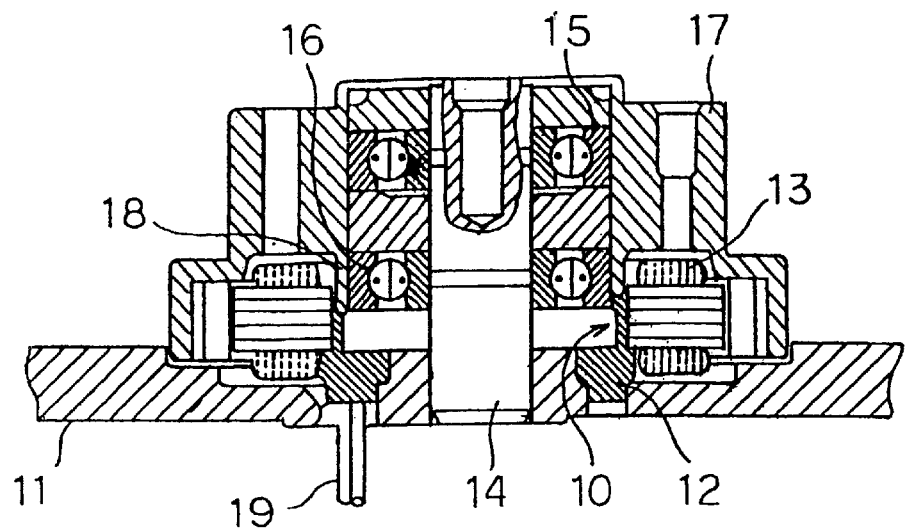
FIG. 5 is a sectional view of assembled motor structure applied this invention.
Figure 6:
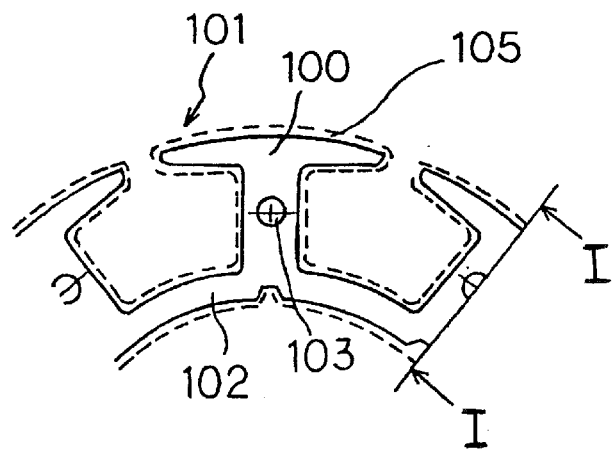
FIG. 6 is a partial front view of prior art.
Figure 7:
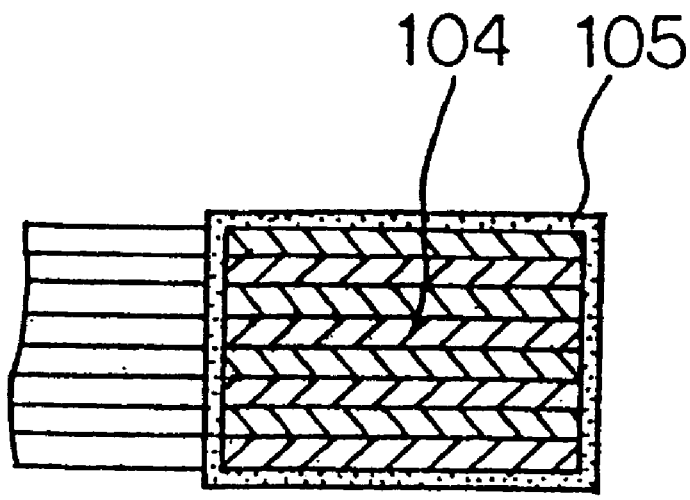
FIG. 7 is a partial sectional view of prior art as seen along line I—I of FIG. 6.

FIG. 5 is a sectional view of the motor structure using the stator pole assembly to which the present invention was applied. The motor is assembled by fitting the projection 9 into a positioning hole 12 formed in a substrate 11, the projection 9 projecting below the stator pole assembly 10 with a stator coil 13 attached thereto, then fixing the stator pole assembly 10 onto the substrate 11 with use of a fixing means (not shown), thereafter fitting bearings 15 and 16 on a support shaft 14 erected on the substrate 11, and further fitting a rotor 17 on the outer races of the bearings 15 and 16. In this motor, a hub 18 which holds the bearings of the rotor 17 is loosely fitted in a non-contact manner into the groove 8 formed inside the stator pole assembly 10. A terminal 19 connected with the stator coil 13 is attached through the projection 9.

Although the present invention has been described above by way of an embodiment thereof, various modifications may be made within the scope of the gist of the present invention. For example, there may be adopted a method in which the stator pole portion 3 is loaded into the mold so that the whole of the outer peripheral surface of the stator pole portion 3 is in contact with the inner wall of the mold and in which the outer peripheral surface of the stator pole portion 3 not coated with the synthetic resin during molding is subjected to an insulating rust preventing treatment by electrode position coating or by spraying a coating material consisting principally of a special silicate and a composite resin to a thickness smaller than the thickness of the insulating film 7' after molding. By forming such a thin film on the whole outer peripheral surface of the stator pole portion 3, it is possible to diminish the gap between the said outer peripheral surface and the inner peripheral surface of the magnet and hence it is possible to further improve the motor torque. Additionally, by contacting the whole outer peripheral surface of the stator pole portion 3 with the inner wall surface of the mold, the positioning of the stator pole assembly 10 with respect to the mold becomes more accurate, the state of short mold due to eccentricity is remedied and a mechanical accuracy such as coaxialness is improved. These modifications and applications are not excluded from the present invention.

In the present invention, as set forth above, since the stator pole portion of the stator pole assembly is covered with an insulating film, a coil can be wound directly round the stator pole without the need of using a bobbin or the like. Thus, the assembling work becomes simpler and the cost is reduced. Since the insulating layer of the synthetic resin which covers the whole of the lamination stack holds the plates in close contact therewith without forming any gap between adjacent plates and provides a hermetic seal, there is no fear of the plates vibrating and generating noise during use, nor is there any fear of rusting on the planar portion of each plate. Moreover, for example a portion for the mounting of other components such as terminals and a positioning portion to be used at the time of mounting the stator pole assembly to the substrate can be formed in the stator pole assembly accurately in a simple manner. Consequently, it is possible to assemble the motor in a simple and accurate manner.

Further, since all of the exposed portions formed at the time of covering the stator pole with the insulating film of the synthetic resin by molding are covered with an insulating film, it is possible to improve the electric insulation performance.

What I claim is:

1. A method for manufacturing a motor structure having a laminated structure of a plurality of plates and a stator pole assembly formed with a component mounting portion, comprising:

preparing a plurality soft iron plates each having an annular yoke portion, and a plurality of stator pole portions which project radially outwardly from the yoke portion and stator pole teeth formed at an end portion of each stator pole portion;

stacking the plurality of soft iron plates;

setting the stacked soft iron plates into a mold;

pressing both upper and lower surfaces of the stacked soft iron plates by protrusions which are formed in the mold;

injection molding a synthetic resin into the mold to cover a portion of the stacked soft iron plates including an outer peripheral surface of the stator pole teeth, and binding the stacked soft iron plates to each other with the synthetic resin layer and integrally forming a circular groove and a projection formed integrally with the synthetic resin layer to hold and position components of the motor, the circular groove being located at a first end of the inside of the yoke portion, and receiving a motor hub component of the motor, and the projection being formed circularly and being located on a second end of the inside of the yoke portion, opposite the first end of the inside of the yoke portion, a center of the projection forming a hole to communicate the interior of the hole with the circular groove, and the projection fitting into a positioning hole in a substrate to position the pole assembly into the substrate ; and covering a portion of the stacked soft iron plates not covered with the synthetic resin layer with an insulting film.

2. A method for manufacturing a motor structure according to claim 1, wherein said protrusions press on the stator pole teeth portions and the yoke portion during molding.

3. A method for manufacturing a motor structure according to claim 1, further comprising forming said insulating film with an electrode position coating.

4. A method for manufacturing a motor structure according to claim 1, further comprising forming said insulating film with a spray coating.

5. A method for manufacturing a motor structure according to claim 1, further comprising forming said insulating film thinner than said synthetic resin layer.

6. A method for manufacturing a motor having a stator pole assembly formed with a component mounting portion, comprising:

stacking a plurality soft iron plates, each of said soft iron plates having an annular yoke portion, a plurality of stator pole portions which project radially outwardly from the yoke portion, and stator pole teeth formed at an end portion of each stator pole portion;

setting the stacked plurality of soft iron plates into a mold;

pressing upper and lower surfaces of the stacked soft iron plates by protrusions formed in the mold;

injecting a synthetic resin into the mold to cover a portion of the stacked soft iron plates including an outer peripheral surface of the stator pole teeth, and to bind the stacked soft iron plates to each other with synthetic resin layers while integrally forming a projection portion with the synthetic resin layer for positioning the stator pole assembly; and covering any portion of the stacked soft iron plates not covered with the synthetic resin layer with an insulating film.

7. A method for manufacturing a motor structure having a laminated structure of a plurality of plates and a stator pole assembly formed with a component mounting portion, comprising:

preparing a plurality soft iron plates each having an annular yoke portion, and a plurality of stator pole portions which project radially outwardly from the yoke portion and stator pole teeth formed at an end portion of each stator pole portion;

stacking the plurality of soft iron plates;

setting the stacked soft iron plates into a mold;

pressing both upper and lower surfaces of the stacked soft iron plates by protrusions which are formed in the mold; p1 injection molding a synthetic resin into the mold to cover a portion of the stacked soft iron plates including an outer peripheral surface of the stator pole teeth, and binding the stacked soft iron plates to each other with the synthetic resin layer and integrally forming a projection portion with the synthetic resin layer for positioning the stator pole assembly; and covering a portion of the stacked soft iron plates not covered with the synthetic resin layer with an insulting film.

* * * * *

UNITED STATES PATENT AND TRADEMARK OFFICE
CERTIFICATE OF CORRECTION

PATENT NO. : 6,407,472 B1
DATED : June 18, 2002
INVENTOR(S) : Shinichi Takayanagi It is certified that error appears in the above-identified patent and that said Letters Patent is hereby corrected as shown below:

Column 6,
Line 39, after "mold", delete "P1" and begin a new paragraph.

Signed and Sealed this

Twenty-fourth Day of September, 2002

Attest:

Attesting Officer

JAMES E. ROGAN
Director of the United States Patent and Trademark Office